D. R. Bruton,
Animal Trap.
No. 92,010. Patented June 29, 1869.

Witnesses
H. P. Sanders
J. W. Ritter Jr.

Inventor
D. R. Bruton

United States Patent Office.

DAVID R. BRUTON, OF THOMASVILLE, NORTH CAROLINA.

Letters Patent No. 92,010, dated June 29, 1869.

IMPROVED ANIMAL-TRAP.

The Schedule referred to in these Letters Patent and making part of the same.

*To all whom it may concern:*

Be it known that I, DAVID R. BRUTON, of Thomasville, in the county of Davidson, in the State of North Carolina, have invented a new and improved Animal-Trap, especially adapted to catching rats and mice; and I do declare the following to be a full and exact description thereof, reference being had to the accompanying drawings, and letters marked thereon.

The nature of my invention consists in providing to catch animals in concealed places, as, for example, under corn in the crib, or oats, hay, or fodder in the barn, by placing the trap over a hole in the floor, so that when the animals are caught, they fall through into a barrel of water, and are destroyed.

To enable others to make and use my invention, I will describe its construction and operation.

Figure 1:
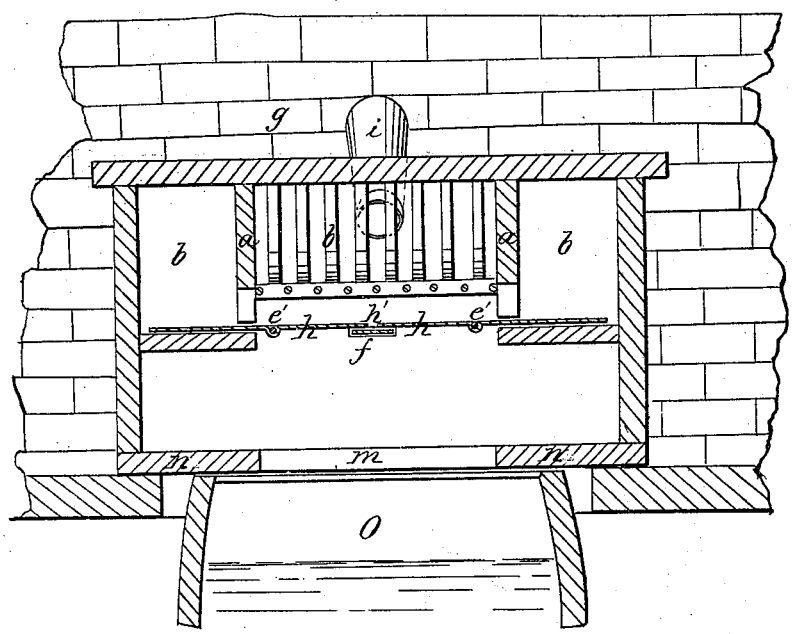
Figure 2:
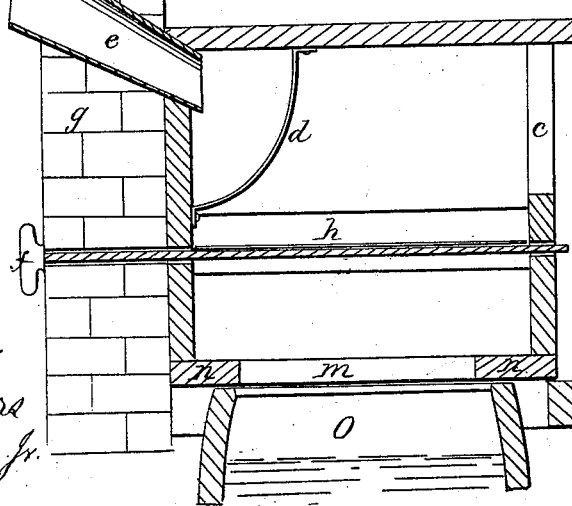

I construct a box, (front view, Figure 1, and end view, Figure 2,) with two partitions $a\ a$, making three sections $b\ b\ b$, with an entrance at $c$, in fig. 2, and a rack, plainly seen in fig. 1, and whose shape is shown at $d$, fig. 2, and a tube, $e$, passing through the wall $g$ of a house, through which I introduce bait into the rack $d$, and two fall-doors $h\ h$, working on axles at $e'\ e'$, and meeting at $h'$, and also a stay-beam, $f$, passing through the trap under the fall-doors $h\ h$, at the place of meeting at $h'$, which I use at pleasure to support the fall-doors, while feeding the animals before attempting to catch them.

I place the trap over a hole, $m$, in the floor $n\ n$ of the house, under which the barrel of water O is placed, into which the animals fall and are destroyed.

What I desire to secure by Letters Patent of the United States, is—

The combination of the tube $e$, the rack $d$, the stay-beam $f$, and fall-doors, substantially as described above.

D. R. BRUTON.

Witnesses:
    EDM. F. BROWN,
    B. S. HEDRICK.